(12) United States Patent  
Martin Hernandez

(10) Patent No.: US 7,850,119 B2  
(45) Date of Patent: Dec. 14, 2010

(54) SEALING SYSTEM FOR THE GAP EXISTING BETWEEN THE FUSELAGE AND THE ELEVATOR OF THE ORIENTABLE HORIZONTAL STABILISER OF AN AIRCRAFT, EXTENDED WITH AN AERODYNAMIC FAIRING FOR SEALING OF THE OPENING EXISTING BETWEEN THE FUSELAGE AND THE ORIENTABLE HORIZONTAL STABILISER

(75) Inventor: Agustín Mariano Martin Hernandez, Getafe (ES)

(73) Assignee: Airbus Operations, S.L., Getafe (Madrid) (ES)

( * ) Notice: Subject to any disclaimer, the term of this patent is extended or adjusted under 35 U.S.C. 154(b) by 900 days.

(21) Appl. No.: 11/790,401

(22) Filed: Apr. 25, 2007

(65) Prior Publication Data

US 2010/0282907 A1    Nov. 11, 2010

(30) Foreign Application Priority Data

May 16, 2006 (ES) ................................ 200601258

(51) Int. Cl.  
    *B64C 7/00* (2006.01)
(52) U.S. Cl. .................. 244/131; 244/214; 244/130
(58) Field of Classification Search ......... 244/213–216, 244/87–89, 130–131  
See application file for complete search history.

(56) References Cited

U.S. PATENT DOCUMENTS

| | | | | |
|---|---|---|---|---|
| 2,526,929 A * | 10/1950 | Bowcott | ..................... | 244/130 |
| 3,968,946 A * | 7/1976 | Cole | .......................... | 244/130 |
| 4,219,203 A * | 8/1980 | Lovelace et al. | ............ | 277/637 |
| 4,384,693 A * | 5/1983 | Pauly et al. | ................. | 244/130 |
| 4,471,925 A * | 9/1984 | Kunz | .......................... | 244/130 |
| 4,637,573 A * | 1/1987 | Perin et al. | ................... | 244/130 |
| 5,222,699 A * | 6/1993 | Albach et al. | ............... | 244/215 |
| 5,518,210 A * | 5/1996 | Friberg | ........................ | 244/215 |
| 5,845,877 A * | 12/1998 | Justice et al. | ............... | 244/131 |
| 6,209,824 B1 * | 4/2001 | Caton et al. | ................. | 244/213 |

\* cited by examiner

*Primary Examiner*—Galen Barefoot  
(74) *Attorney, Agent, or Firm*—Wenderoth, Lind & Ponack, L.L.P.

(57) ABSTRACT

Sealing system for the gap (2) between the fuselage (3) and the elevator (4) of the orientable horizontal stabiliser (5) of an aircraft, extended with an aerodynamic fairing (8) for sealing of the opening (24) between the fuselage (3) and said orientable horizontal stabiliser (5) which comprises a main body (1) and an aerodynamic fairing (8) which is extended from the main body (1) in continuity with the latter, and a plurality of first elastic sealing profiles (9) between the first surface (11) of the main body (1) including the aerodynamic fairing (8) and the outer surface of the fuselage (3) and making contact with them, and a plurality of second elastic sealing profiles (13) between the second surface (12) of the main body (1) and the first end of the elevator (15) and making contact with them, in such a way that the sealing takes place of the gap (2) and the opening (24) and an aerodynamic continuity is produced between the orientable horizontal stabiliser (5), the fuselage (3) and the elevator (4) when the elevator (4) is at rest in the plane of the orientable horizontal stabiliser (5) for any of the orientation positions of the orientable horizontal stabiliser (5).

28 Claims, 6 Drawing Sheets

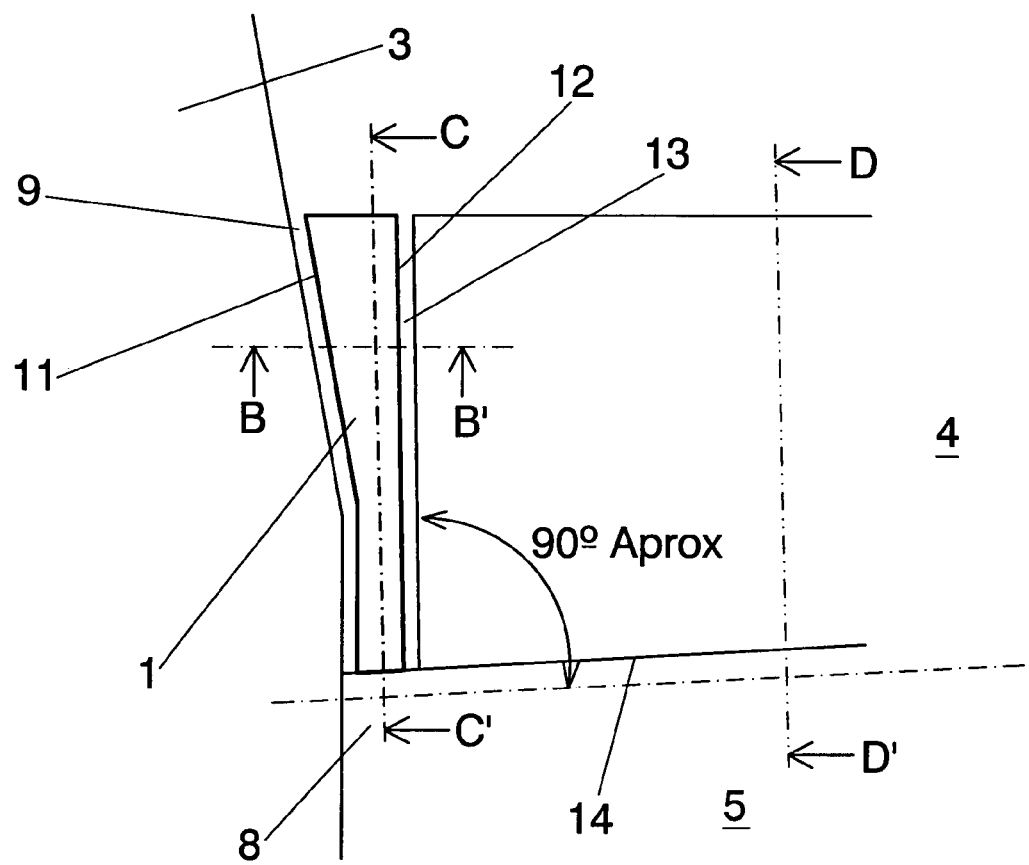
FIG. 5
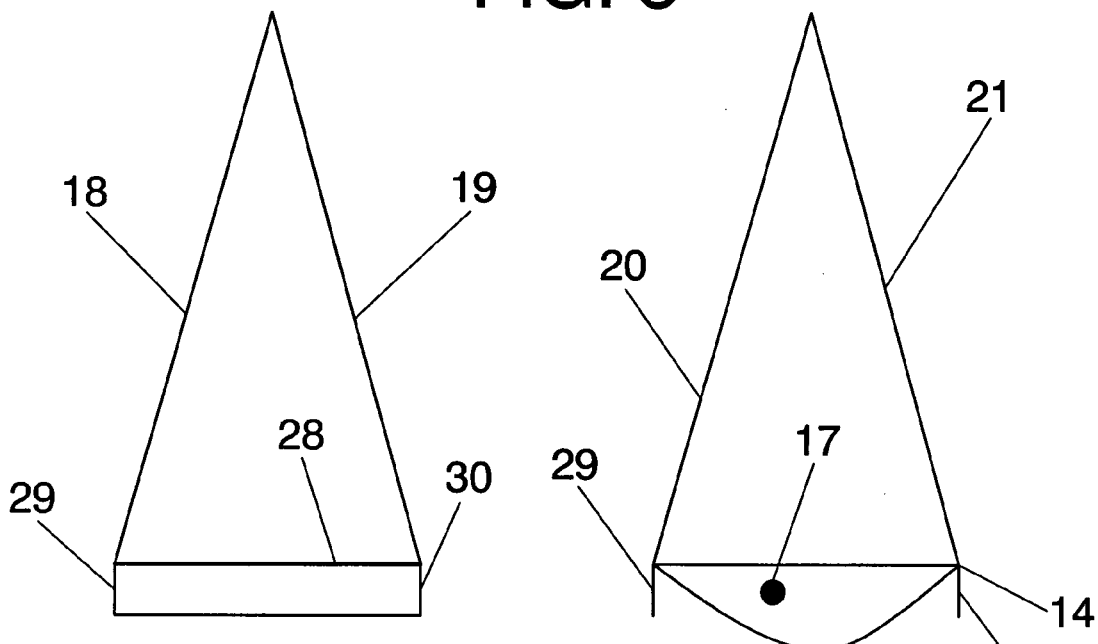
FIG. 6
FIG. 7

SEALING SYSTEM FOR THE GAP EXISTING BETWEEN THE FUSELAGE AND THE ELEVATOR OF THE ORIENTABLE HORIZONTAL STABILISER OF AN AIRCRAFT, EXTENDED WITH AN AERODYNAMIC FAIRING FOR SEALING OF THE OPENING EXISTING BETWEEN THE FUSELAGE AND THE ORIENTABLE HORIZONTAL STABILISER

TECHNICAL FIELD OF THE INVENTION

This invention belongs to the technical field of sealing systems intended to cover gaps or openings in outer surfaces of vehicles in the aeronautical sector, and more particularly to the field of sealing systems intended to cover gaps existing between the fuselage and the elevator of an aircraft with an orientable horizontal stabiliser, and at the same time the openings existing between the fuselage and the orientable horizontal stabiliser.

STATE OF THE PRIOR ART OF THE INVENTION

In the large majority of aircraft there exists a gap or opening between the elevator of each horizontal stabiliser and the fuselage. This opening is necessary for permitting the movements made by the elevator in different manoeuvres of the aircraft such as ascent or descent.

On the other hand, during cruise conditions, which represent the major part of the operating time of an aircraft, the elevator does not move, being at rest in the plane of the horizontal stabiliser.

During these cruise conditions, owing to the incidence of the airflow on the opening, certain loads are created which increase the aerodynamic resistance, occasioning various inefficiencies, among others an increase in fuel consumption.

So, in order to avoid this increase in aerodynamic resistance created by the airflow, it would be desirable to seal the gap existing between the elevator and the fuselage during cruise conditions in which said elevator remains at rest in the plane of the horizontal stabiliser. During manoeuvres in which movements of the elevator take place, the opening varies in size and shape, but while those manoeuvres are taking place this opening does not need to be sealed since the manoeuvres account for a minimal operating time of the aircraft and the impact of the increase in aerodynamic resistance at these moments is negligible.

The complexity of the situation increases when the horizontal stabilisers in which the elevators are located are orientable, in other words, their position can be varied by inclining them in order to achieve stability by means of centring the forces acting on the aircraft, since for the correct movement of the stabilisers there exist some openings between said stabilisers and the fuselage, which are larger than the gaps existing between the elevator and the fuselage, and therefore they increase the aerodynamic resistance even more.

So far, in the state of the art solutions have been known for sealing the gap existing between the fuselage and the elevator in aircraft with a fixed horizontal stabiliser, but not for sealing the gap in aircraft with an orientable horizontal stabiliser, said gap being even greater than in the previous case, which meant that the increase in the aerodynamic resistance owing to the gap and the inefficiencies caused by it, revealed in a higher fuel consumption and increased environmental impact, had to be accepted.

Likewise, solutions were known in the state of the art for the sealing of the openings existing between the horizontal stabiliser and the fuselage. Said solutions consist of aerodynamic fairings which cover those openings and carry out their sealing. All classes of aerodynamic fairing in existence are fixed to the stabiliser, and they have to move with it in its orientation movements, sliding on some specially conditioned surfaces of the fuselage by means of anti-friction paints or coatings. In the state of the art a distinction is made between flexible aerodynamic fairings formed from rods and membranes, and semi-rigid aerodynamic fairings formed from panels fixed to the orientable horizontal stabiliser.

So, even when already known solutions are used for sealing the gap between the fuselage and the elevator in fixed horizontal stabilisers, and the existing fairings are in addition used for covering the openings between the horizontal stabiliser and the fuselage, there will also remain the problem of sealing the gaps existing between the fuselage and the elevator in orientable horizontal stabilisers, given that there is no known solution for them in the state of the art. As a result, the increase in the aerodynamic resistance owing to the gap existing between the fuselage and the elevator in orientable horizontal stabilisers and the inefficiencies caused by this increase in resistance, revealed in a higher fuel consumption and increased environmental impact, has so far had to be accepted.

A system was therefore desirable which would solve the problems existing in the state of the art.

DESCRIPTION OF THE INVENTION

The aim of the present invention is to overcome the drawbacks of the state of the art previously described by means of a sealing system for the gap existing between the fuselage and the elevator of the orientable horizontal stabiliser of an aircraft, extended with an aerodynamic fairing for sealing of the opening existing between the fuselage and the orientable horizontal stabiliser.

Said sealing system succeeds in covering the gap between the elevator and the fuselage during cruise conditions in which said elevator is at rest in the plane of the orientable horizontal stabiliser for any of the possible orientations of said orientable horizontal stabiliser, thereby reducing the aerodynamic resistance and as a result of that reducing the fuel consumption and environmental impact. Moreover, said sealing system covers the opening existing between the fuselage and the orientable horizontal stabiliser, due to which, with a single system, all the necessary cavities for the proper movement of the orientable horizontal stabiliser and elevator remain sealed and the aerodynamic resistance is thus reduced.

The sealing system forming the object of the invention comprises a main body with a substantially prismatic and elongated shape located in the gap existing between the elevator and the fuselage, being fixed to the horizontal stabiliser. The main body comprises an upper surface which forms a continuation of the upper surface of the elevator and a lower surface which forms a continuation of the lower surface of the elevator, the gap thus being covered above and below.

In addition, the sealing system comprises an aerodynamic fairing with a substantially elongated shape which, in one particular embodiment, is extended from the main body in continuity with the latter, covering the opening existing in the zone of the fuselage in which the orientable horizontal stabiliser is provided.

In a particular alternative embodiment of the invention, the upper and lower surfaces of the main body are an extension of the surface of the aerodynamic fairing, said surfaces forming a single continuous surface, thus achieving a greater continuity of the aerodynamic fairing with the main body and simplifying the geometry of the components of the sealing system.

Between both the upper and lower surfaces there exists at least one longitudinal vertical element comprising a first surface facing the fuselage and a second surface facing the elevator. Between this first surface of the longitudinal vertical element and the outer surface of the fuselage there exists a plurality of first elastic sealing profiles making contact with both, and also between the aerodynamic fairing and the outer surface of the fuselage, and between this second longitudinal vertical element and the elevator there exists a plurality of second elastic sealing profiles making contact with both.

In this way, the sealing of the gap is carried out, with an aerodynamic continuity taking place between the fuselage and the elevator, and the fuselage and the orientable horizontal stabiliser, thanks to the main body, the aerodynamic fairing and the elastic sealing profiles, when the elevator is at rest positioned in the plane of the orientable horizontal stabiliser for any of the possible orientation positions of said horizontal stabiliser.

Likewise, the longitudinal vertical element provides firmness, rigidity and resistance for the main body. In the event that it is wished to carry out the sealing of large gaps between the elevator and the fuselage, a wider main body will be needed, and for the embodiment of this main body more than one longitudinal vertical element is used, which will be arranged along the entire width of the main body.

In a particular embodiment of the invention, the main body includes at least one transverse vertical element between the upper surface and the lower surface in which the fixing means are provided for said main body to the horizontal stabiliser.

The main body can be created in different materials such as metal, plastic or composite materials including low density materials such as carbon fibre, depending on the mechanical properties it is wished to give to the sealing system according to the size of the aircraft, the size of the gap and the loads to bear. The main advantage of metallic materials is their low cost and ease of manufacture and maintenance as well as possessing high resistance, while plastics and composites display the advantage of less weight and absence of fatigue and corrosion effects.

Similarly, the main body can also be made of a single piece, or be formed from several pieces assembled together, this latter embodiment displaying the advantage of ease of manufacture and the possibility of producing sealing systems of widely varying shapes and sizes, by producing their constituent parts separately and then joining those parts together.

The aerodynamic fairing can be made in a single piece or consist of a plurality of pieces assembled together. This latter embodiment has the advantage of simplicity of manufacture of aerodynamic fairings of widely varying shapes and sizes and better fits by producing their constituent parts separately and then joining those parts together. On the other hand, the advantage of the aerodynamic fairing in a single piece lies in its greater aerodynamic continuity.

In a particular embodiment of the invention, the aerodynamic fairing is formed from a first arm which arises from the upper surface of the main body and a second arm which arises from the lower surface of the main body, one on each side of the orientable horizontal stabiliser and with a shape similar to the opening existing between the fuselage and said stabiliser, in such a way that the sealing of that opening takes place.

In an embodiment similar to this, the aerodynamic fairing is extended along the upper surface of the orientable horizontal stabiliser and the lower surface of the orientable horizontal stabiliser as far as covering the forward part of said orientable horizontal stabiliser. The advantage of this embodiment is the complete continuity of the surface, which minimises the aerodynamic resistance.

In an embodiment of the invention, the aerodynamic fairing makes contact with a small degree of bending on the outer surface of the fuselage in such a way that a structural preloading is produced which guarantees contact of the aerodynamic fairing with the fuselage in all possible orientations of the orientable horizontal stabiliser.

The aerodynamic fairing can be created in different materials such as metal, plastic or composites with low density elements like carbon fibre, which displays the advantage compared to the others of high sealing capacity combined with low weight.

Moreover, the aerodynamic fairing and the main body can be produced integrally in a single piece, or they can be different pieces joined together by means of assembly methods.

In terms of the elastic sealing profiles, these are the ones which guarantee the sealing of the gap and the complete continuity between the main body, including the aerodynamic fairing, the fuselage and the elevator. These sealing profiles can be created in different materials such as gums, rubbers and silicones, and in addition their outer surface includes a fabric surface with a low coefficient of friction, such as Teflon-based fabrics, in order to facilitate the relative movement between the components separated by the seal and prevent deterioration due to rubbing and friction, providing an additional protection against various outside agents.

In certain embodiments of the sealing system, owing to the forces which are going to be applied to it, the sealing profiles can be reinforced in order to increase their resistance by means of internal or external reinforcements carried out with metal, plastics, fabrics or composites, which will be applied according to the needs of functionality.

The fixing of the first elastic sealing profiles, in other words, those making contact with the main body and the aerodynamic fairing, and the fuselage, is done to the main body and the aerodynamic fairing. Also, in a preferred embodiment of the invention, the zone of the fuselage that is in contact with the sealing system is coated with a layer made of a friction-resistant material in order to prevent marks caused by rubbing of the sealing profiles due to movement of the sealing system.

On the other hand, the fixing of the second elastic sealing profiles, in other words, those making contact with the main body and the elevator, can be done either to the main body or to the elevator.

BRIEF DESCRIPTION OF THE FIGURES

In order to facilitate a better understanding of this specification and forming an integral part thereof, some drawings are attached in which, on a basis that is illustrative and not limiting, the object of the invention has been represented in some of its different embodiments.

FIG. 5 is an enlarged schematic view of the sealing system of FIG. 3.

FIG. 6 is a schematic view in cross-section along the line CC' of FIG. 5.

FIG. 7 is a schematic view in cross-section along the line DD' of FIG. 5.

Figure 1:
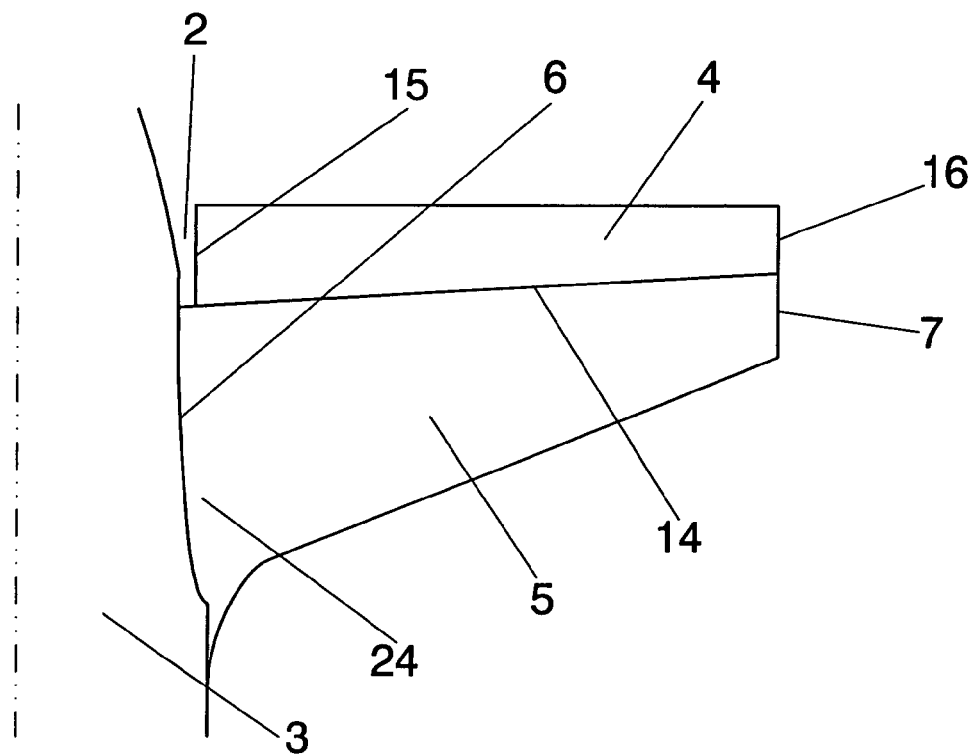
FIG. 1 is a general schematic view of the arrangement of the stabiliser, the elevator, the fuselage, the opening existing in the fuselage in the zone where the orientable horizontal stabiliser joins and the gap existing between the elevator and the fuselage.

Appearing in these figures are numerical references identifying the following elements:

1 Main body
2 Gap between the fuselage and the elevator
3 Fuselage
4 Elevator
5 Orientable horizontal stabiliser
6 First end of the orientable horizontal stabiliser
7 Second end of the orientable horizontal stabiliser
8 Aerodynamic fairing
9 First elastic sealing profiles
10 Contour of the main body
11 First surface of the main body
12 Second surface of the main body
13 Second elastic sealing profiles
14 Rear end of the orientable horizontal stabiliser
15 First end of the elevator
16 Second end of the elevator
17 Axis of rotation of the elevator
18 Upper surface of the main body
19 Lower surface of the main body
20 Upper surface of the elevator
21 Lower surface of the elevator
22 Longitudinal vertical element
23 Transverse vertical element
24 Opening in the fuselage in its zone of union with the stabiliser
25 First branch of the aerodynamic fairing
26 Second branch of the aerodynamic fairing
27 Conventional aerodynamic fairing which seals the opening of the fuselage
28 Fixing means
29 Upper surface of the orientable horizontal stabiliser
30 Lower surface of the horizontal stabiliser
31 Forward part of the orientable horizontal stabiliser

MODES OF EMBODIMENT OF THE INVENTION

FIG. 1 shows a general view of the application environment of the sealing system of the invention, where the rear zone of the fuselage 3 of the aircraft can be appreciated in which the orientable horizontal stabiliser is provided in which is located the elevator 4. The orientable horizontal stabiliser 5 comprises a first end 6 joined to the fuselage 3 and a second free end 7, and the elevator 4 comprises a first end 15 in proximity to the fuselage 3 and a second free end 16. FIG. 1 shows the opening 24 existing between the fuselage 3 and the orientable horizontal stabiliser 5 in order to permit the correct movement of the latter, and in addition it shows the gap 2 existing between the fuselage 3 and the elevator 4 for permitting the correct movement of said elevator 4 and of the orientable horizontal stabiliser 5. Said opening 24 and said gap 2 give rise to an aerodynamic resistance owing to the passage of the airflow through them, which has the consequence of a greater need for power for the correct functioning of the aircraft, and therefore greater fuel consumption, with the consequent impact on the cost and a greater environmental impact.

Figure 2:
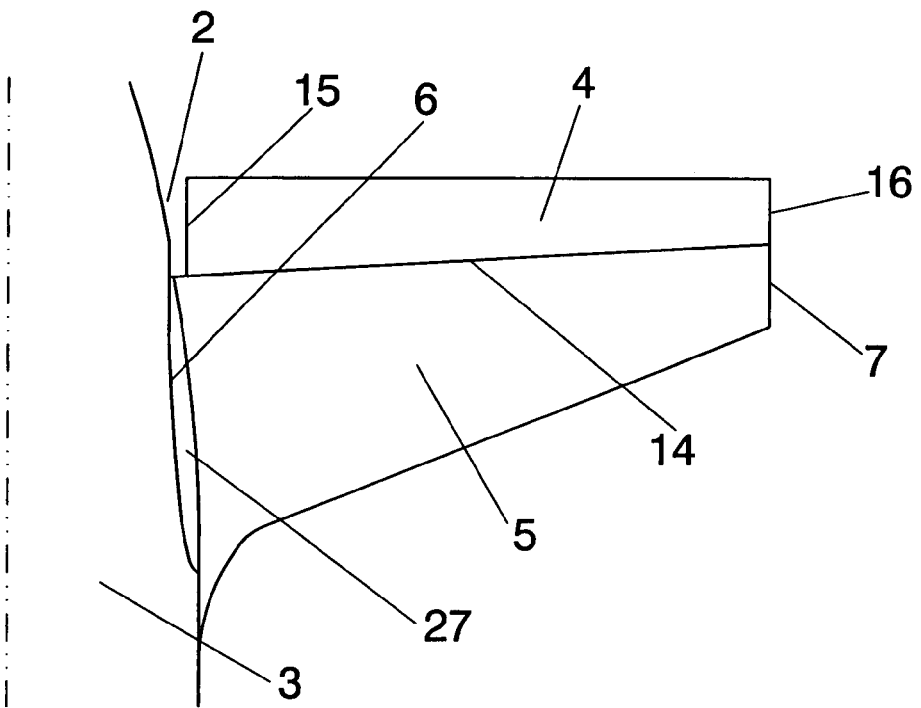
FIG. 2 is a schematic view of the general arrangement of the elements of FIG. 1, where an aerodynamic fairing existing in the state of the art is used for sealing the opening of the fuselage.

FIG. 2 show a general view of the same zone as FIG. 1, but applying a conventional aerodynamic fairing of the state of the art. As can be seen, with this fairing the opening 24 existing between the horizontal stabiliser and the fuselage 3 is sealed, but not the gap 2 existing between the elevator 4 and the fuselage, due to which an aerodynamic resistance will be created which will increase the loads, producing greater fuel consumption and greater environmental impact.

The sealing system of the present invention has the aim of solving this problem in a way that is simple and efficient by means of complete sealing both of the opening 24 and of the gap 2 with a single device, and at the same time permitting correct movement both of the elevator 4 and of the orientable horizontal stabiliser 5.

Figure 3:
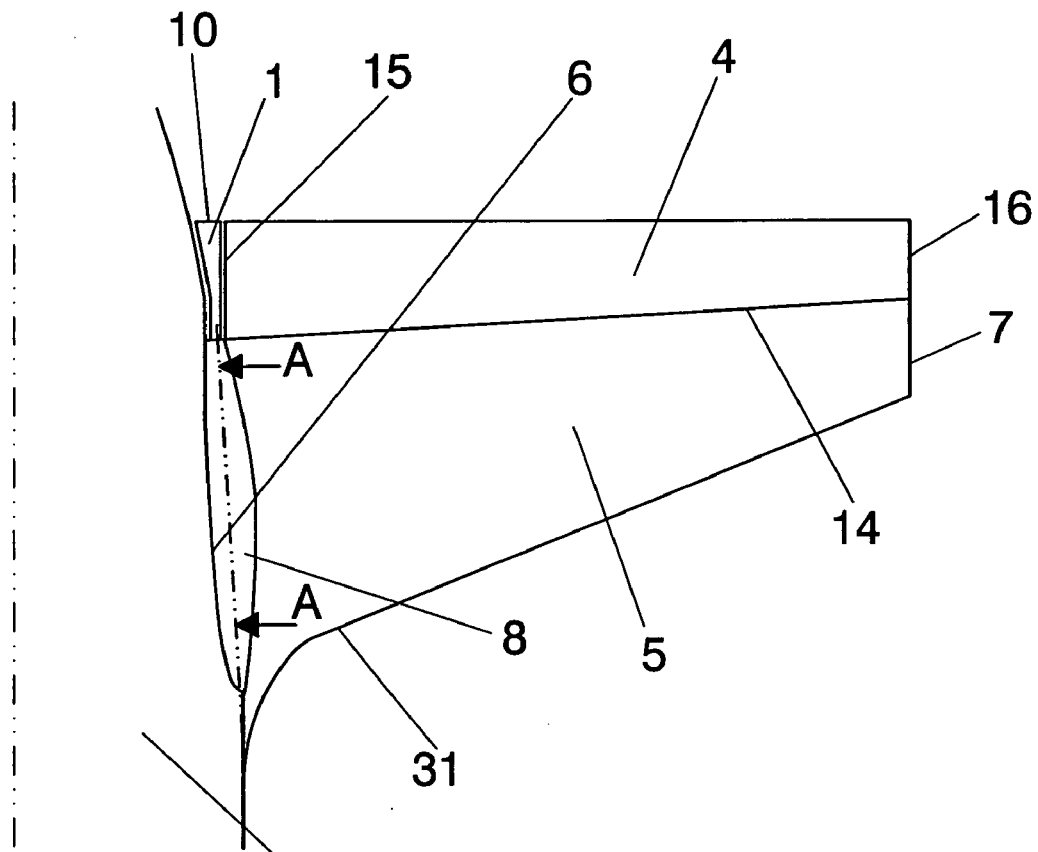
FIG. 3 is a schematic view of the general arrangement of the elements of FIG. 1, where the present invention is being applied, with the main body sealing the gap and the aerodynamic fairing which is extended from the main body sealing the opening of the fuselage.

FIG. 3 shows a sealing system forming the inventive object, which comprises a main body 1 of substantially prismatic and elongated form, having a contour 10 and in particular displaying certain dimensions and shapes similar to those of the gap 2 existing between the fuselage 3 and the elevator 4 which it is sought to seal. The main body 1 is introduced into the gap 2 and is fixed to the orientable horizontal stabiliser 5 via some conventional fixing means 28 such as screwed or riveted unions. Said fixing can be seen schematically in FIG. 6.

The main body 1 comprises an upper surface 18 and a lower surface 19. The upper surface 18 constitutes a continuation of the upper surface of the elevator 20 and the lower surface 19 constitutes a continuation of the lower surface of the elevator 21.

Between the upper 18 and lower 19 surfaces, the main body 1 comprises at least one longitudinal vertical element 22 which runs the entire length of said main body 1. This longitudinal vertical element 22 confers rigidity and resistance to the main body. If it is necessary to carry out the sealing of large gaps 2 between the elevator 4 and the fuselage 3 requiring wider surfaces 18, 19, various longitudinal vertical elements 22 could be used between both surfaces 18, 19, separated along the entire width of those surfaces 18, 19. The longitudinal vertical element 22 consists of a first surface 11 facing the outer surface of the fuselage 3, and a second surface facing the first end of the elevator 15 and in proximity to that first end of the elevator 15.

As can be seen in FIG. 3, the sealing system furthermore comprises an aerodynamic fairing 8 with a substantially elongated form which is extended from the main body 1 in continuity with it, covering the opening 24 existing in the zone of the fuselage 3 in which the orientable horizontal stabiliser 5 is provided, in such a way that the first elastic sealing profiles 9 make contact with the first surface 11 of the main body 1, including the aerodynamic fairing 8, and the outer surface of the fuselage 3, and the second elastic sealing profiles 13 make contact with the second surface 12 of the main body 1 and the first end of the elevator 15, thereby carrying out the sealing of said gap 2 and of said opening 24, with an aerodynamic continuity being produced between the fuselage 3, the orientable horizontal stabiliser 5 and the elevator 4 by means of said sealing system, when said elevator 4 is at rest, positioned in the plane of the orientable horizontal stabiliser 5 for any of the possible positions of orientation of said orientable horizontal stabiliser 5.

Figure 11:
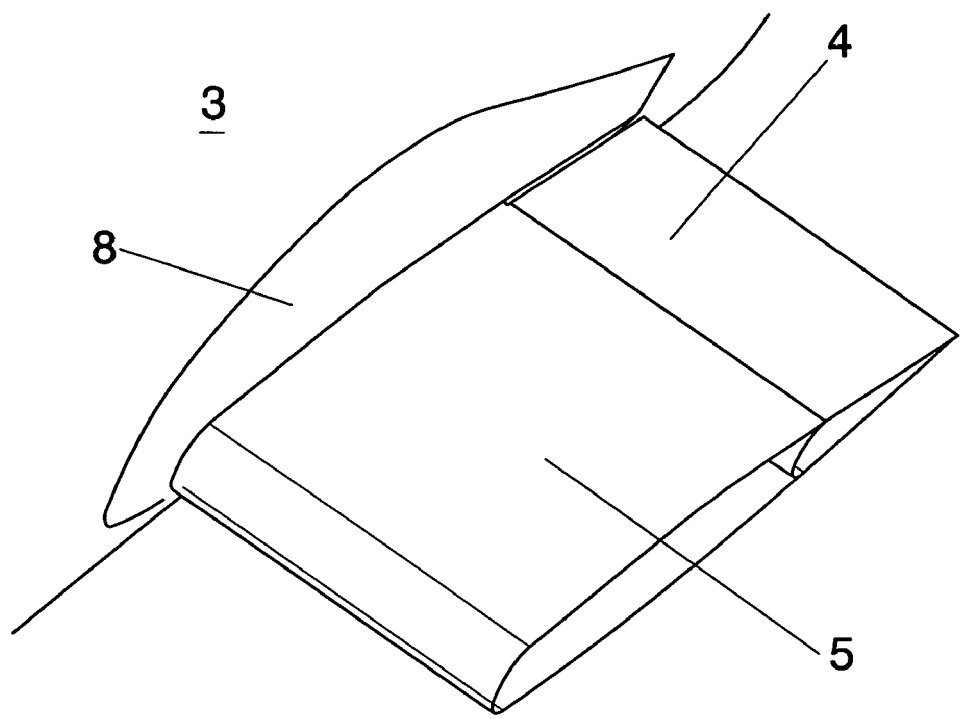
FIG. 11 is a schematic view in perspective of an embodiment of the invention in which the surfaces of the main body are an extension of the surfaces of the fairing, applied in a particular embodiment in which the fairing covers the forward part of the horizontal stabiliser.

FIG. 11 shows an embodiment of the invention in which the upper surface 18 and the lower surface 19 of the main body 1 are an extension of the surface of the aerodynamic fairing 8, said surfaces forming a single continuous surface. This embodiment displays the advantage that said surfaces form a single continuous surface, thus achieving a greater continuity of the aerodynamic fairing 8 with the main body 1 and simplifying the geometry of the components of the sealing system.

Figure 12:
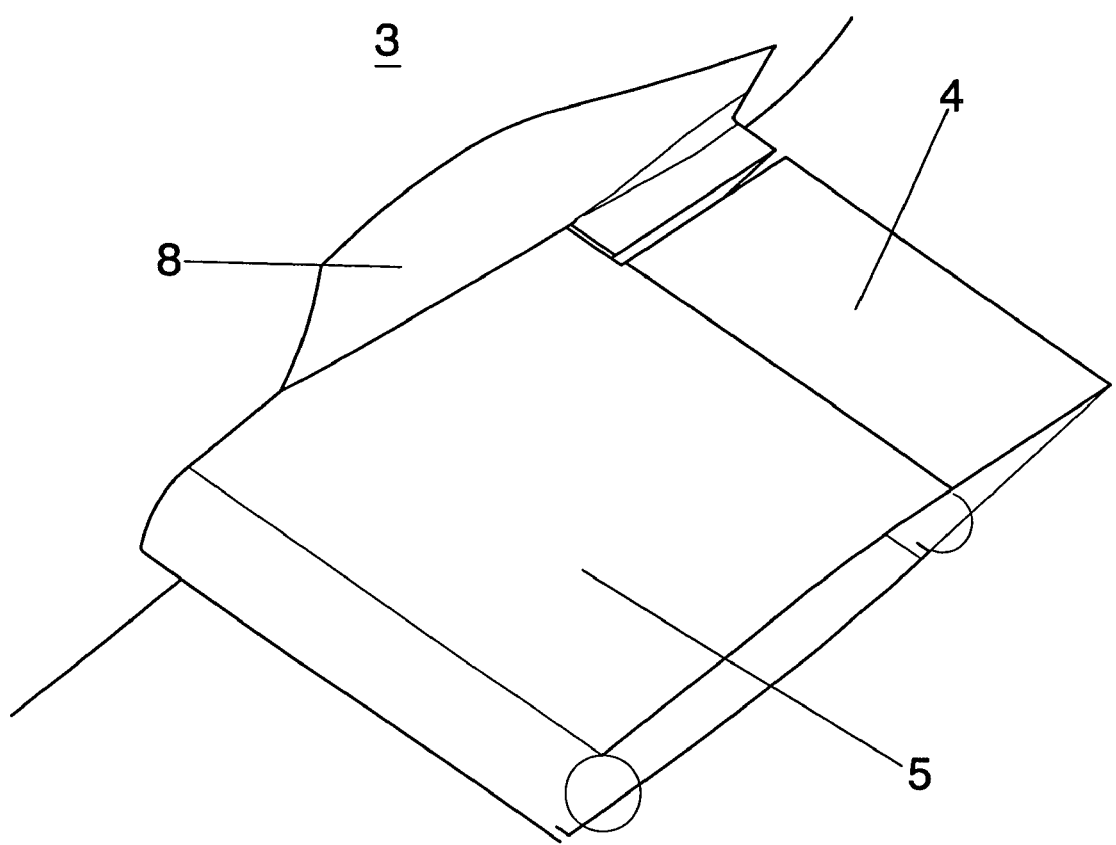
FIG. 12 is a schematic view in perspective of an embodiment of the alternative invention to the above in which the surfaces of the main body constitute an additional continuation to the surface of the fairing, with both those surfaces being differentiated from the latter, in such a way that the upper surface of the said main body constitutes an additional continuation to the upper surface of the elevator, and the lower surface of said main body constitutes an additional continuation to the lower surface of the elevator, applied in a particular embodiment in which the fairing does not cover the forward part of the horizontal stabiliser.

FIG. 12 shows an alternative embodiment of the invention in which the upper surface 18 of the main body constitutes an additional continuation of the upper surface of the elevator 20, and the lower surface 19 of the main body 1 constitutes an additional continuation of the lower surface of the elevator 21, and both surfaces are differentiated from the surfaces of the aerodynamic fairing 8.

FIGS. 6 and 7 show a partial schematic view in cross-section of the sealing system, where the shape adopted by the upper 18 and lower 19 surfaces of the main body can be seen, which is similar to that displayed by the surfaces 20 and 21 of the elevator, in order to achieve continuity between them and, as a consequence, proper sealing which minimises the aerodynamic resistance as much as possible.

According to a preferred embodiment of the main body 1 when it has to be very wide, said main body furthermore includes between the upper surface 18 and the lower surface 19 at least one transverse vertical element 23 perpendicular to the longitudinal vertical element 22. Said transverse vertical element 23 grants rigidity and resistance to the array, and the fixing means 8 can be arranged therein.

In a particular embodiment of the main body 1, this is produced in a single piece, and in another particular embodiment the main piece 1 is formed from a plurality of assembled pieces. This latter embodiment provides the advantage of simplicity of manufacture and the possibility of producing sealing systems with widely varying shapes and sizes, producing the parts it comprises separately and then joining those parts together.

Depending on the application and function of the main body 1, this can be produced using different materials. For large aircraft light alloys made of metallic materials can be used, preferably those of aluminium which, in addition to optimum mechanical properties, also provide the advantages of low cost and great simplicity of manufacture and maintenance. For medium or small size aircraft, plastic materials can be used which have suitable mechanical properties and display the advantages of great versatility in manufacture and the absence of corrosion and fatigue phenomena which appear in metallic materials. Alternatively, and for aircraft of any size, composite materials can be used such as plastics reinforced with fibre-glass or carbon fibre, which provide the advantages of less weight and absence of corrosion and fatigue.

Figure 4:
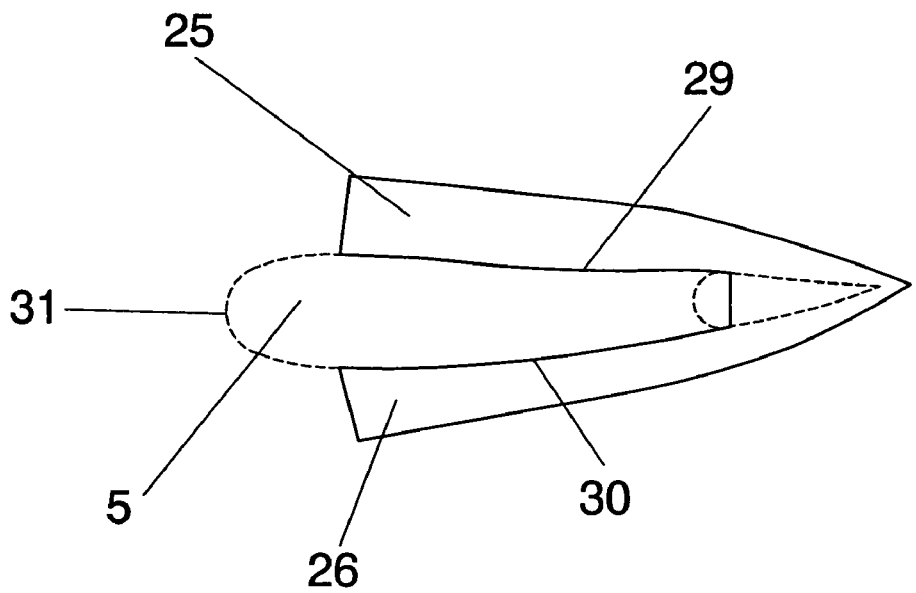
FIG. 4 is a schematic view in cross-section along the line AA' of the embodiment of the aerodynamic fairing in an embodiment of the sealing system of FIG. 3.

FIG. 4 shows in a partial and schematic way a particular embodiment of the aerodynamic fairing 8 in which said aerodynamic fairing 8 comprises a first branch 25 which arises from the upper surface of the main body 18 and a second branch 26 which arises from the lower surface of the main body 19, said branches 25, 26 being separated from each other by a distance equal to the thickness of the orientable horizontal stabiliser 5. The two branches 25, 26 display a shape and width substantially similar to the shape and width of the opening 24 in the fuselage 3, in such a way that the orientable horizontal stabiliser 5 is arranged between the two branches 25, 26 and the sealing of the opening 24 takes place.

Figure 10:
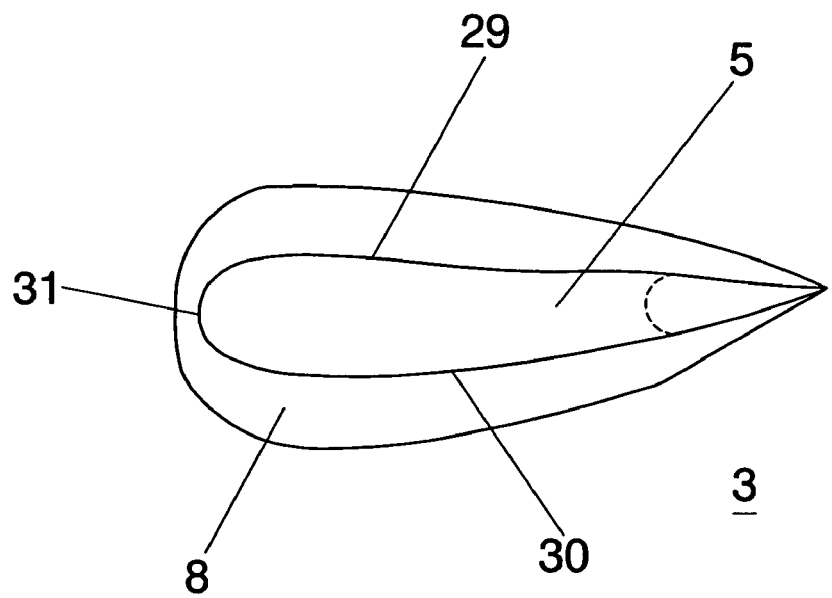
FIG. 10 is a schematic view in cross-section of an embodiment of the sealing system of the invention.

FIG. 10 shows a particular embodiment of the invention in which the aerodynamic fairing 8 is extended along the entire upper surface of the orientable horizontal stabiliser 29 and along the entire lower surface of the orientable horizontal stabiliser 30 as far as covering the forward part 31 of said orientable horizontal stabiliser.

In an additional particular embodiment of the invention, the aerodynamic fairing 8 makes contact with a small degree of bending on the outer surface of the fuselage 3, thereby producing a structural preloading which guarantees contact of that aerodynamic fairing 8 with the fuselage 3 in all possible orientations of the orientable horizontal stabiliser 5, ensuring the correct sealing of the opening 24 and therefore a reduction in aerodynamic resistance.

In terms of the different embodiments of the aerodynamic fairing 8, this can be produced in a single piece, or it can be formed from a plurality of assembled pieces. An aerodynamic fairing 8 created in a single piece displays the advantages of greater aerodynamic continuity due to the fact that there are no fissures, and is usually used for sealing openings 24 in large fuselages. On the other hand, an aerodynamic fairing 8 created from several pieces assembled together displays the advantages of greater ease of manufacture, ease of producing widely varying shapes and assembling the different pieces properly, and a greater ease of adjustment, since the different pieces can be fitted independently.

Likewise, the main body 1 of the sealing system and the aerodynamic fairing 8 can be carried out integral in a single piece, or on the other hand they can be different pieces joined together by means of assembly.

The aerodynamic fairing 8 can be created in various materials such as metal, plastic and composites containing low density elements, though, as is natural, if it is produced in a single piece integral with the main body 1, the material will be that of the latter.

In addition to the main body 1 and the aerodynamic fairing 8, the sealing system also comprises a plurality of elastic sealing profiles 9 arranged between the first surface 11 of the main body 1 including the aerodynamic fairing 8, and the outer surface of the fuselage 3, and a plurality of second elastic sealing profiles 13 arranged between the second surface 12 of the main body 1 and the first end of the elevator 15. The first elastic sealing profiles 9 make contact with the first surface 11 of the main body 1 including the aerodynamic fairing 8, and the outer surface of the fuselage 3, and the second elastic sealing profiles 13 make contact with the second surface 12 of the main body 1 and the first end of the elevator 15, thereby, and in conjunction with the upper surface of the main body 18 and the lower surface of the main body 19, carrying out the sealing of the gap 2 and the opening 24, and with an aerodynamic continuity being produced between the orientable horizontal stabiliser 5, the fuselage 3 and the elevator 4 when the elevator is at rest, positioned in the plane of the orientable horizontal stabiliser 5 for any of the possible positions of orientation of said orientable horizontal stabiliser 5. For any other position of the elevator 4 with respect to the orientable horizontal stabiliser 5, the sealing of the gap 2 will not be carried out completely but this will not have an excessive influence on the aerodynamic resistance since these inclined positions of the elevator 4 with respect to the orientable horizontal stabiliser 5 are produced during the take-off or landing manoeuvres and changes of altitude, and these imply a minimum length of time compared to the total flying time.

FIG. 5 shows an enlarged schematic view of the elements making up the sealing system and their arrangement, in an embodiment of the invention in which the assembly of main body 1 and elastic sealing profiles 9, 13 are arranged in the gap 2 in such a way that the second surface 12 of the main body 1 is arranged in a manner perpendicular to the axis of rotation 17 of the elevator 4, such that said second surface of the main body is parallel to the first end of the elevator 15. The advantages of this embodiment are ease of design and of manufacture and installation with which complete sealing of the gap 2 and continuity between the elevator 4 and the fuselage 3 are achieved, permitting the necessary movements both of the elevator 4 and of the orientable horizontal stabiliser 5.

In different embodiments of the first and second elastic sealing profiles 9, 13, these are produced in different elastic materials such as gum, rubber and silicone, with silicone being preferably used owing to its resistant behaviour towards outside agents, its high flexibility and its durability.

In a preferred embodiment of the invention, a layer of low friction fabric is fixed on the outer surface of each of the first elastic sealing profiles 9 and on the outer surface of each of the second elastic sealing profiles 13. This layer of low friction fabric has the advantage of avoiding wear of the surfaces of the sealing profiles 9, 13 when there exists sliding between them and the components that they make contact with owing to the relative movement between the components making contact with those sealing profiles 9, 13.

In a preferred embodiment of the layer of low friction fabric, the layer is produced using fabrics based on Teflon.

With the aim of providing greater resistance so that the different forces applied to them can be withstood, both the first elastic sealing profiles 9 and the second elastic sealing profiles 13 can be reinforced by means of different means of reinforcement. In one embodiment, these means of reinforcement consist of a reinforcement internal to the sealing profiles 9, 13, combined within the thickness of them, and in an alternative embodiment, these means of reinforcement consist of a reinforcement external to the sealing profiles 9, 13. The internal reinforcements can be made from various materials depending on the application, such as fabric, plastic materials, metallic materials, and composites which include low density materials. Also, the external reinforcements can be made from plastic materials, metallic materials, and composites which include low density materials.

In a preferred embodiment of the invention elastic sealing profiles 9, 13, are used made of silicone coated in a low friction fabric produced from Teflon and reinforced by internal reinforcement layers of fabric.

The first elastic sealing profiles 9 have to be fixed to the first surface 11 of the main body 1, including the aerodynamic fairing, and slide on the outer surface of the fuselage 3 since the position of the main body 1, including the aerodynamic fairing 8, will move owing to the movement of the orientable horizontal stabiliser 5 and its position will be variable with regard to the fuselage 3, and, therefore, if they are fixed to said fuselage 3 for a given position of the orientable horizontal stabiliser 5, for the rest of the positions the sealing of the gap 2 will be incorrect. On the other hand, in terms of the second elastic sealing profiles 13, both their fixing to the elevator 15 sliding with respect to the second surface 12 of the main body 1, and their fixing to the second surface 12 of the main body 1 sliding with regard to the first end of the elevator 15 is optimum, given that in this case said first end of the elevator 15 and said second surface 12 of the main body 1 remain aligned in the same position during most of the flying time, apart from during instants of manoeuvres in which movements of the elevator 4 take place.

The elastic sealing profiles 9, 13 are fixed to the surfaces by fixing means that are conventional in themselves such as fastening by means of threaded unions or rivets, or via additional housings and fittings.

Figure 8:
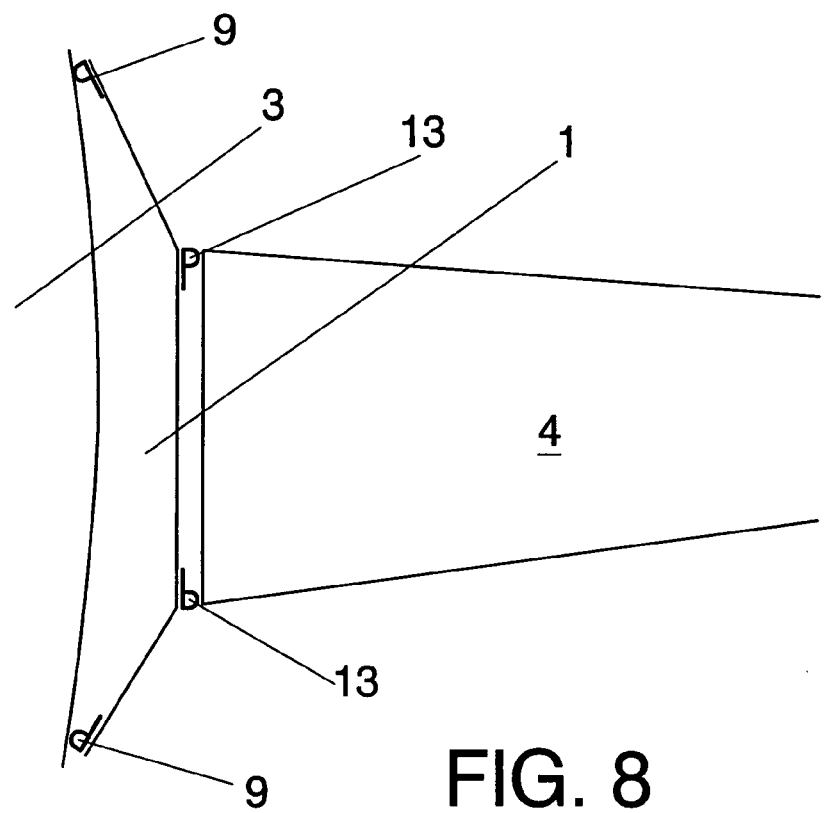
FIG. 8 is a schematic view in cross-section along the line BB' of FIG. 5 according to an embodiment of the elastic sealing profiles.
Figure 9:
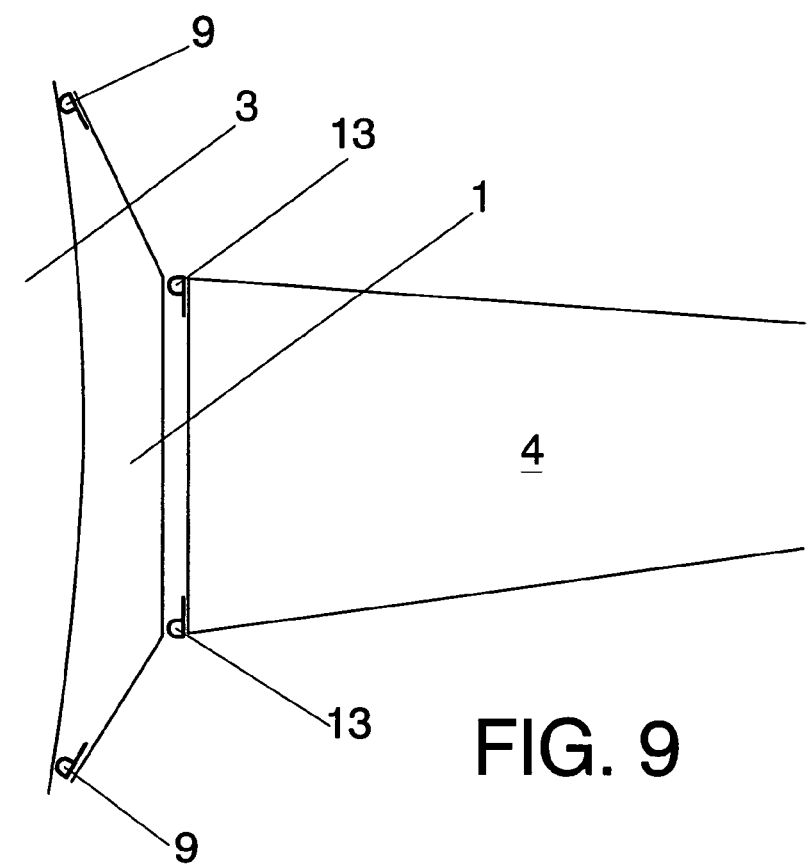
FIG. 9 is a schematic view in cross-section along the line BB' of FIG. 5 according to an alternative embodiment of the elastic sealing profiles.

FIG. 8 show a particular embodiment of the invention in which the first elastic sealing profiles 9 are fixed to the first surface 11 of the main body 1 and the aerodynamic fairing 8, and a sliding of them takes place on the outer surface of the fuselage 3, and the second elastic sealing profiles 13 are fixed to the second surface 12 of the main body 1 and a sliding of them takes place on the first end of the elevator 15. FIG. 9 shows a particular embodiment of the invention in which, as with the above embodiment, the first elastic sealing profiles 9 are fixed to the first surface 11 of the main body 1 and the aerodynamic fairing 8, but in this case the second elastic sealing profiles 13 are fixed to the first end of the elevator 15 and sliding of them is produced on the second surface 12 of the main body 1.

Both in the embodiment shown in FIG. 8 and, preferably, in the embodiment shown in FIG. 9, the zone of the fuselage 3 in contact with the first elastic sealing profiles 9 is coated with a material resistant to friction in order to avoid possible wear produced on the fuselage owing to friction between said fuselage and the first elastic sealing profiles 9 originated by the relative displacements of the latter.

The invention claimed is:

1. Sealing system for the gap existing between the fuselage and the elevator of the orientable horizontal stabiliser of an aircraft, extended with an aerodynamic fairing for sealing of the opening existing between the fuselage and the orientable horizontal stabiliser, said fuselage comprising an opening in the zone in which the orientable horizontal stabiliser is provided, said orientable horizontal stabiliser comprising a first end joined to the fuselage and a second free end, the elevator comprising a first end in proximity to the fuselage and a second free end, the sealing system comprising a main body of substantially elongated form arranged in the gap existing between the fuselage and the first end of the elevator of each of the orientable horizontal stabilisers, said main body being fixed to the orientable horizontal stabiliser by fixing means, said main body comprising an upper surface and a lower surface;

at least one longitudinal vertical element arranged between the upper surface and the lower surface and which runs the entire length of said main body, said longitudinal vertical element comprising a first surface facing the outer surface of the fuselage, and in proximity to said outer surface of the fuselage, and a second surface facing the first end of the elevator and in proximity to said first end of the elevator;

a plurality of first elastic sealing profiles arranged between the first surface of the main body and the outer surface of the fuselage which make contact with said first surface and said outer surface of the fuselage, and a plurality of second elastic sealing profiles arranged between the second surface of the main body and the first end of the elevator, said sealing system being wherein it comprises an aerodynamic fairing of substantially elongated form which is extended from the main body in continuity with it, covering the opening existing in the zone of the fuselage in which the orientable horizontal stabiliser is provided, in such a way that the first elastic sealing profiles make contact with the first surface of the main body, including the aerodynamic fairing, and the outer surface of the fuselage, and the second elastic sealing profiles make contact with the second surface of the main body and the first end of the elevator, thereby carrying out the sealing of said gap and of said opening, and producing an aerodynamic continuity between the fuselage, the orientable horizontal stabiliser and the elevator by means of said sealing system, when said elevator is at rest, positioned in the plane of the orientable horizontal stabiliser for any of the possible positions of orientation of said orientable horizontal stabiliser.

2. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the upper surface of the main body constitutes a continuation of the upper surface of the elevator, and the lower surface of the main body constitutes a continuation of the lower surface of the elevator, and both surfaces are differentiated from the surfaces of the aerodynamic fairing.

3. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the upper surface and the lower surface of the main body are an extension of the surface of the aerodynamic fairing, said surfaces forming a single continuous surface.

4. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the main body comprises between the upper surface and the lower surface at least one transverse vertical element perpendicular to the longitudinal vertical element.

5. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 4, wherein the fixing means are arranged in the transverse vertical element.

6. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the main body is a single piece.

7. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the main body is formed from a plurality of assembled pieces.

8. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the main body is made from materials selected from among metal, plastic, composites with low density elements and a combination thereof.

9. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the first elastic sealing profiles and the second elastic sealing profiles are made from materials selected from between gum, rubber and silicone.

10. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein it comprises a layer of low friction fabric fixed on the outer surface of each of the first elastic sealing profiles and on the outer surface of each of the first elastic sealing profiles.

11. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the layer of low friction fabric is produced from fabrics based on Teflon.

12. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the first elastic sealing profiles include at least one internal reinforcement combined within the thickness of said first elastic sealing profiles and made from materials selected from among layers of fabric, plastic materials, metallic materials, composites which include low density elements and a combination thereof.

13. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the first elastic sealing profiles include at least one external reinforcement made from materials selected from among layers of fabric, plastic materials, metallic materials, composites which include low density elements and a combination thereof.

14. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the second elastic sealing profiles comprise at least one internal reinforcement combined within the thickness of said second elastic sealing profiles and made from materials selected from among layers of fabric, plastic materials, metallic materials, composites which include low density elements and a combination thereof.

15. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the second elastic sealing profiles comprise at least one external reinforcement made from materials selected from among layers of fabric, plastic materials, metallic materials, composites which include low density elements and a combination thereof.

16. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the first elastic sealing profiles are fixed to the first surface of the main body, including to the aerodynamic fairing.

17. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 16, wherein the zone of the fuselage in contact with the first elastic sealing profiles is coated with a layer made from a friction resistant material.

18. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the second elastic sealing profiles are fixed to the first end of the elevator.

19. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the second elastic sealing profiles are fixed to the second surface of the main body.

20. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the second surface of the main body is arranged in a manner perpendicular to the axis of rotation of the elevator, in such a way that said second surface of the main body is parallel to the first end of the elevator.

21. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the main body and the aerodynamic fairing are produced integrally in a single piece.

22. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the main body and the aerodynamic fairing are different pieces joined together by means of assembly.

23. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the aerodynamic fairing is a single piece.

24. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the aerodynamic fairing is formed from a plurality of assembled pieces.

25. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the aerodynamic fairing comprises a first branch which arises from the upper surface of the main body and a second branch which arises from the lower surface of the main body, said branches being separated from each other by a distance equal to the thickness of the orientable horizontal stabiliser, the two branches displaying a shape substantially similar to the shape of the opening in the fuselage, in such a way that the orientable horizontal stabiliser is arranged between the two branches and the sealing of the opening takes place.

26. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the aerodynamic fairing makes contact with a small degree of bending on the outer surface of the fuselage, in such a way that a structural preloading is produced which guarantees contact of said aerodynamic fairing with the fuselage in all possible orientations of the orientable horizontal stabiliser.

27. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the aerodynamic fairing is extended along the entire upper surface of the orientable horizontal stabiliser and along the entire lower surface of the orientable horizontal stabiliser as far as covering the forward part of said orientable horizontal stabiliser.

28. Sealing system for the gap existing between the fuselage and the elevator of the orientable horizontal stabiliser of an aircraft, extended with an aerodynamic fairing for sealing of the opening existing between the fuselage and the orientable horizontal stabiliser, according to claim 1, wherein the aerodynamic fairing is made from materials selected from among metal, plastic, composite with low density elements and a combination thereof.

* * * * *